United States Patent [19]

Kumazawa et al.

[11] Patent Number: 5,721,037
[45] Date of Patent: Feb. 24, 1998

[54] HONEYCOMB STRUCTURAL BODIES AND METHOD OF PRODUCING THE SAME

[75] Inventors: Kazuhiko Kumazawa, Nagoya; Tatsuya Ishiguro, Tajimi, both of Japan

[73] Assignee: NGK Insulators, Ltd., Japan

[21] Appl. No.: 508,702

[22] Filed: Jul. 28, 1995

[30] Foreign Application Priority Data

Aug. 2, 1994 [JP] Japan .................................. 6-181526

[51] Int. Cl.$^6$ .................................................. B32B 17/00
[52] U.S. Cl. ........................... 428/116; 501/143; 502/63; 502/87; 502/84
[58] Field of Search ..................... 428/116; 501/143; 502/63, 84, 87

[56] References Cited

U.S. PATENT DOCUMENTS

| | | | |
|---|---|---|---|
| 2,967,156 | 1/1961 | Talvenheimo | 502/82 |
| 4,132,669 | 1/1979 | Choca et al. | 502/208 |

FOREIGN PATENT DOCUMENTS 0466305  1/1992  European Pat. Off. .
5-309232  11/1993  Japan .
WO 94/20211  9/1994  WIPO .

*Primary Examiner*—Timothy Speer
*Attorney, Agent, or Firm*—Parkhurst & Wendel, LLP

[57] ABSTRACT

A honeycomb structural body is obtained by mixing 60~80 wt % of aggregate, which does not show a transformation of crystal structures substantially up to 500° C., and 20~40 wt % of clay to obtain a mixture, adding phosphate as a hardening agent to the mixture in such a manner that more than 2.0 wt % of phosphoric acid exists therein with respect to 100 wt % of the mixture, adding a forming agent and a water to the mixture to obtain a formable batch, extruding the batch into a honeycomb structure to obtain a honeycomb structural formed body, drying the honeycomb structural formed body, and subjecting the honeycomb structural formed body to a heat treatment in 300°~500° C. The thus obtained honeycomb structural body has excellent catalyst carrying property and fireproof property, which are used as a catalyst carrier for ozone dissolving, deodorizing and so on in an inexpensive manner.

6 Claims, No Drawings

HONEYCOMB STRUCTURAL BODIES AND METHOD OF PRODUCING THE SAME

BACKGROUND OF THE INVENTION

(1) Field of the Invention

The present invention relates to honeycomb structural bodies and a method of producing the same, which are used as a catalyst carrier for ozone dissolving, deodorizing and so on at a relatively low temperature.

(2) Related Art Statement

Generally, as for catalyst carriers for carrying a catalyst used at a relatively low temperature such as a catalyst for dissolving ozone component generated from a duplication apparatus or a catalyst for removing an offensive odor generated in a factory or a home, use was made of a corrugate structural body formed by using a kraft paper or a corrugated cardboard (referred to, for example, Japanese Patent Laid-Open Publication No. 5-309,232), or a corrugate structural body formed by using a foil, or a ceramic honeycomb structural body made of cordierite, mullite and so on.

However, the known catalyst carriers mentioned above do not have sufficient properties as mentioned below. That is to say, in the corrugate structural body made of a kraft paper or a corrugated cardboard, there is a problem with a fireproof property. For example, in the case that the corrugate structural body is used as the catalyst carrier for dissolving ozone generated from a corona discharging portion of a duplication apparatus of indirect discharging type, it is required that the corrugate structural body has a fireproof property. In this case, since a paper constituting the corrugate structural body has no fireproof property, it is necessary to provide a fireproof property in the corrugate structural body. However, it is not possible to obtain a complete fireproof property of the corrugate structural body, and thus there remains a problem with safety.

Moreover, in the corrugate structural body made of a foil, there is a problem such that a catalyst carrying operation becomes extremely difficult, since foil has no water absorbing property. Further, the ceramic honeycomb body made of cordierite, mullite and so on, has sufficient properties as the catalyst carrier used in a relatively low temperature, since it is generally used for a catalyst carrier for purifying an exhaust gas from automobiles or factories, which is used at a relatively high temperature. However, since such a ceramic honeycomb body has an over-quality as a catalyst carrier used in a technical field which is aimed by the present invention, there is a drawback that it costs much.

SUMMARY OF THE INVENTION

It is an object of the invention to eliminate the drawbacks mentioned above and to provide honeycomb structural bodies and a method of producing the same having excellent catalyst carrying property and fireproof property, which are used as a catalyst carrier for ozone dissolving, deodorizing and so on in an inexpensive manner.

According to the invention, a honeycomb structural body comprises, 60~80 wt % of aggregate, which does not show a transformation of crystal structures substantially up to 500° C., 20~40 wt % of clay, and more than 2.0 wt % of phosphoric acid with respect to a sum (100 wt %) of said aggregate and clay.

Moreover, according to the invention, a method of producing honeycomb structural bodies mentioned above, comprises the steps of mixing 60~80 wt % of aggregate, which does not show a transformation of crystal structures substantially up to 500° C., and 20~40 wt % of clay to obtain a mixture, adding phosphate as a hardening agent to said mixture in such a manner that more than 2.0 wt % of phosphoric acid exists therein with respect to 100 wt % of said mixture, adding a forming agent and a water to said mixture to obtain a formable batch, extruding said batch into a honeycomb structure to obtain a honeycomb structural formed body, drying said honeycomb structural formed body, and subjecting said honeycomb structural formed body to a heat treatment at 300°~500° C.

In the constitutions mentioned above, since use is made of inorganic raw materials consisting of a predetermined amount of aggregate having predetermined properties and a phosphate as a hardening agent, it is possible to obtain honeycomb structural bodies having excellent catalyst carrying property and fireproof property, which have a sufficient strength as a catalyst carrier for ozone dissolving, deodorizing and so on, only by effecting a heat treatment at a low temperature such as 300°~500° C. Moreover, since the heat treatment is performed at a low temperature, it is possible to obtain honeycomb structural bodies having a high precision, in which a variation of a dimension of the body is small between dimensions of the body just after an extrusion and after a heat treatment.

In the present invention, as for an aggregate, it is possible to use inorganic raw materials such as alumina, mullite, silica stone, feldspar, agalmatolite, talc, sherd and so on, which are widely used in a ceramic field, if they do not show a transformation of crystal structures substantially up to 500° C. In this case, the reason for limiting the use of the aggregate which does not show a transformation of crystal structures substantially up to 500° C. is as follows. That is to say, in a catalyst carrier used for dissolving ozone or deodorizing which is aimed by the present invention, it is assumed that the maximum temperature during a real use is substantially 500° C. Moreover, the reason for limiting an amount of the aggregate to 60~80 wt % is as follows. That is to say, if an amount of the aggregate is not more than 60 wt %, an amount of the clay is increased and thus a pore volume of of the ceramic honeycomb structural body after the heat treatment becomes small. If an amount of the aggregate is not less than 80 wt %, an amount of the clay is decreased and thus a strength of the ceramic honeycomb structural body becomes low.

As for a clay for a plasticizer, it is possible to use widely a clay such as kaolin, bentonite, kibushi-clay, gairome-clay or the like. The reason for limiting an amount of the clay to 20~40 wt % is as follows. That is to say, if an amount of the clay is not more than 20 wt %, a strength of the ceramic honeycomb body after the heat treatment is decreased. If an amount of the clay is not less than 40 wt %, a pore volume of the ceramic honeycomb structural body becomes small.

As for a phosphate used as a hardening agent, it is preferred to use a phosphate consisting of more than one element selected from a group of Al, Mg, Fe, Be and is further preferred to use an aluminum phosphate purchased on a market as a liquid state, because they have an excellent dispersing property and thus a hardening effect can be obtained by a small amount of them. In this case, it is necessary to include more than 2.0 wt % of a phosphoric acid component in the ceramic honeycomb structural body. Therefore, it is necessary to add a predetermined amount of a phosphate with respect to a sum (100 wt %) of aggregate and clay in such a manner that an amount of phosphoric acid component is more than 2.0 wt %. The reason is as follows. That is to say, if an amount of the phosphoric acid component is not more than 2.0 wt %, a hardening effect after the heat treatment can not be realized sufficiently and thus a crack is generated in the ceramic honeycomb structural body. Moreover, if an amount of the phosphate to be added is increased, a strength of the ceramic honeycomb structural body after the heat treatment is increased correspondingly. However, since cost of the phosphate especially aluminum phosphate, is high, it is necessary to determine an amount of the phosphate by taking into consideration of a condition to be used etc.

A forming agent to be used is not limited, but it is preferred to use 2~7 wt % of methylcellulose with respect to a sum (100 wt %) of aggregate and clay. The reason for preferably limiting an amount of methylcellulose to 2~7 wt % is as follows. That is to say, if an amount of methylcellulose is not more than 2 wt %, a sufficient flowability during the extrusion can not be obtained and in an extreme case a crack may be generated in the ceramic honeycomb structural formed body during the drying. Moreover, methylcellulose starts to decompose and fire from about 200° C. and generates a heat. Therefore, if an amount of methylcellulose is not less than 7 wt %, high temperature portions are partially generated in the honeycomb structural formed body during the heat treatment, and a crack may be generated in the honeycomb structural body.

Moreover, in a method of producing the honeycomb structural bodies, a temperature during the heat treatment for realizing a hardening effect due to the use of phosphate is limited to 300°~500° C. The reason of this limitation is as follows. If a temperature during the heat treatment is not more than 300° C., the hardening effect due to an addition of the phosphate is not realized sufficiently. Further, the selected aggregate according to the invention does not show a transformation of crystal structures substantially up to 500° C.

DESCRIPTION OF THE PREFERRED EMBODIMENTS

Hereinafter, actual examples will be explained.

EXAMPLE 1

In order to observe an effect of an addition of aluminum phosphate as a phosphate to be added, at first, a mixture was prepared by mixing an aggregate consisting of 30 wt % of alumina having a mean particle diameter of 3.0 μm and 30 wt % of mullite having a mean particle diameter of 13.6 μm, and 40 wt % of gairome-clay having a mean particle diameter of 3.8 μm. Then, 2.0~10.0 wt % of aluminum phosphate (1.6~8.0 wt % of phosphoric acid) varied according to the following Table 1 were added with respect to the mixture (100 wt %). Further, 2.0 wt % of methylcellulose as a forming agent and a water were added to the mixture (100%) for plasticizing the mixture to obtain ceramic batches. Then, the thus obtained batch was extruded respectively into a honeycomb structural formed body having a square shape of 25.4×25.4×50 mm and 6 mil (wall thickness: 150 μm)/400 cpi$^2$ (cell density: 62 cell/cm$^2$). Then, the honeycomb structural formed body was dried and was subjected to a heat treatment at 300° C. for 1 hour to obtain honeycomb structural bodies according to sample Nos. 1~5 in Table 1. After that, compression strengths of the honeycomb structural bodies were measured respectively, and also appearances of the honeycomb structural bodies were observed by naked eyes. The results are shown in Table 1.

TABLE 1

| Sample No. | Aggregate (wt %) | Clay (wt %) | Aluminum phosphate (wt % with respect to sum of aggregate and clay) | Phosphoric acid (wt % with respect to sum of aggregate and clay) | Methyl-cellulose (wt % with respect to sum of aggregate and clay) | Compression strength (kgf/cm$^2$) | Appearance |
|---|---|---|---|---|---|---|---|
| 1 | Alumina: 30 + Mullite: 30 | Gairome-clay: 40 | 2.0 | 1.6 | 2.0 | 40 | Crack generation |
| 2 | | | 2.5 | 2.0 | | 65 | no crack |
| 3 | | | 3.5 | 2.7 | | 90 | no crack |
| 4 | | | 7.0 | 5.6 | | 140 | no crack |
| 5 | | | 10.0 | 8.0 | | 220 | no crack |

From the results shown in Table 1, the sample No. 1 including not more than 2 wt % of phosphoric acid has a crack, while the sample Nos. 2~5 each including more than 2.0 wt % of phosphoric acid have no crack and excellent compression strengths. Therefore, it is understood that it is necessary to limit an amount of aluminum phosphate to be added to more than 2.5 wt % so as to include more than 2.0 wt % of phosphoric acid therein. It should be noted that the compression strength is measured by cutting the honeycomb structural body into a square shape of 25.4×25.4×25.4 mm and applying a compression pressure to the cut out body.

EXAMPLE 2

In order to observe an effect of an addition of gairome-clay as a clay to be added, alumina, mullite, gairome-clay, aluminum phosphate and methylcellulose, each having the same mean particle diameters as those of the example 1 were mixed as shown in the following Table 2 in the same manner as that of the example 1 to obtain formable ceramic batches. Then, the thus obtained batches were extruded respectively into a honeycomb structural formed body having a circular shape of diameter: 100 mm, length: 100 mm and 6 mil/400 cpi$^2$. Then, the honeycomb structural formed body was dried and was subjected to a heat treatment at 300° C. in the same manner as that of the example 1 to obtain honeycomb structural bodies according to sample Nos. 6~10 in Table 2. After that, compression strengths of the honeycomb structural bodies were measured in such a manner that a compression pressure is applied to a cut-out body of diameter: 25.4 and length: 25.4 mm. Moreover, pore volumes of the honeycomb structural bodies were measured by using a mercury-insertion method. The results are shown in Table 2.

TABLE 2

| Sample No. | Aggregate (wt %) | Gairome-caly (wt %) | Additives (wt % with respect to sum of aggregate and clay) | Compression strength (kgf/cm²) | Volume of pore (cc/g) |
|---|---|---|---|---|---|
| 6 | Alumina: 30, Mullite: 60 | 10 | Methylcellulose: 2 | 18 | 0.220 |
| 7 | Alumina: 30, Mullite: 50 | 20 | + | 54 | 0.180 |
| 8 | Alumina: 30, Mullite: 40 | 30 | Aluminum phosphate: 5 | 80 | 0.152 |
| 9 | Alumina: 30, Mullite: 30 | 40 | (Phosphoric acid: 4.0) | 103 | 0.137 |
| 10 | alumina: 30, Mullite: 20 | 50 | | 118 | 0.118 |

From the results shown in Table 2, the sample No. 6 including 10 wt % of clay has an excellent pore volume but has an extremely low compression strength. Moreover, the sample No. 10 including 50 wt % of clay has a high compression strength but has a worse pore volume such as less than 0.13 cc/g. As a result, it is understood that it is necessary to limit an amount of clay to be added to 20–40 wt %.

EXAMPLE 3

In order to observe an effect of kinds of aggregates, alumina 1 (mean particle diameter: 3 μm), alumina 2 (mean particle diameter: 7 μm), alumina 3 (mean particle diametr: 0.7 μm), feldspar (mean particle diameter: 13.6 μm), mullite (mean particle diameter: 13.6 μm), silica stone (mean particle diameter: 5.2 μm), agalmatolite (mean particle diameter: 4.1 μm), talc (mean particle diameter: 12.0 μm), as an aggregate and gairome-clay, methylcellulose and aluminum phosphate were mixed as shown in the following Table 3 in the same manner as that of the example 1 to obtain formable ceramic batches. In this case, all the aggregates mentioned above do not show a transformation of crystal structures up to 500° C. Then, honeycomb structural bodies according to sample Nos. 11~18 in Table 3 each having the same shape as that of the example 2 were obtained from the ceramic batches in the same manner as that of the example 2. After that, the compression strength and the pore volume of the honeycomb structural bodies were measured in the same manner as those of the example 2. The results are shown in Table 3. From the results shown in Table 3, it is understood that an excellent compression strength and an excellent pore volume can be obtained in all the aggregates mentioned above within the scope of the invention.

EXAMPLE 4

In order to observe an effect of a heat treatment, alumina 2, mullite and gairome-clay as a main component, and methylcellulose and aluminum phosphate as an additive were mixed as shown in the following Table 4 to obtain formable ceramic batches. Then, honeycomb structural bodies according to sample Nos. 19–23 in Table 4 each having the same shape as that of the example 2 were obtained from the ceramic batches in the same manner as that of the example 2 except that a heat treatment condition is varied as shown in Table 4. After that, the compression strength and the pore volume of the honeycomb structural bodies were measured in the same manner as those of the example 2. The results are shown in Table 4. From the results shown in Table 4, it is understood that the sample No. 19 subjected to the heat treatment at 250° C. show a worse compression strength and a worse pore volume, and thus it is necessary to limit a temperature of the heat treatment to 300°~500° C.

TABLE 3

| Sample No. | Aggregate (wt %) | Clay (wt %) | Additives (wt % with respect to sum of aggregate and clay) | Compression strength (kgf/cm²) | Volume of pore (cc/g) |
|---|---|---|---|---|---|
| 11 | Alumina 1: 60 | Gairome-clay: 40 | Methylcellulose: 2 | 88 | 0.189 |
| 12 | Alumina 2: 60 | | + | 95 | 0.167 |
| 13 | Alumina 3: 60 | | Aluminum phosphate: 5 | 72 | 0.189 |
| 14 | Feldspar: 60 | | (Phosphoric acid: 4.0) | 63 | 0.163 |
| 15 | Mullite: 60 | | | 96 | 0.137 |
| 16 | Silica stone: 60 | | | 85 | 0.155 |
| 17 | Agalmatolite: 60 | | | 53 | 0.199 |
| 18 | Talc: 60 | | | 60 | 0.180 |

TABLE 4

| Sample No. | Main composition (wt %) | Additives (wt % with respect to sum of aggregate and clay) | Thermal treatment temperature | Compression strength (kgf/cm$^2$) | Volume of pore (cc/g) |
| --- | --- | --- | --- | --- | --- |
| 19 | Alumina 2: 40 | Methylcellulose: 2 | 250° C. × 1 hr | 35 | 0.105 |
| 21 | + | + | 300° C. × 1 hr | 108 | 0.137 |
| 22 | Mullite: 30 | Aluminum phosphate: 5 | 400° C. × 1 hr | 138 | 0.135 |
| 23 | + Gairome-caly: 40 | (Phosphoric acid: 4.0) | 500° C. × 1 hr | 208 | 0.142 |

In the examples mentioned above, aluminum phosphate is only shown as an example of phosphate. However, when other phosphates including one or more elements selected from a group of Mg, Fe and Be were used, the same effects as those of the examples mentioned above can be obtained. Moreover, gairome-clay is only shown as an example of clay, but the same effects as those of the examples mentioned above can be obtained if other clays such as kaolin, bentonite and kibushi-clay were used.

As clearly understood from the above explanations, according to the invention, since use is made of inorganic materials consisting of a predetermined amount of aggregate having predetermined properties and a phosphate as a hardening agent, it is possible to obtain honeycomb structural bodies having excellent catalyst carrying property and fireproof property, which have a sufficient strength as a catalyst carrier for ozone dissolving, deodorizing and so on, only by effecting a heat treatment in a low temperature such as 300°–500° C. Moreover, since the heat treatment is performed at a low temperature, it is possible to obtain honeycomb structural bodies having a high precision, in which a variation of a dimension of the body is small between dimensions of the body just after an extrusion and after a heat treatment.

What is claimed is:

1. A honeycomb structural body comprising 60–80 wt % of aggregate having no crystal structure transformation through a temperature range of up to 500° C., 20–40 wt % of clay, and more than 2.0 wt % of phosphoric acid with respect to a sum of said aggregate and clay.

2. The honeycomb structural body according to claim 1, wherein said phosphoric acid exists in a form of a phosphate of one or more elements selected from a group consisting of Al, Mg, Fe and Be.

3. The honeycomb structural body according to claim 2, wherein said phosphate is an aluminum phosphate.

4. The honeycomb structural body according to claim 1, wherein said aggregate comprises one or more materials selected from a group consisting of alumina, mullite, silica stone, feldspar, talc and agalmatolite.

5. The honeycomb structural body according to claim 1, wherein the honeycomb structural body has a pore volume greater than 0.13 cc/g.

6. The honeycomb structural body according to claim 1, wherein the honeycomb structural body has a wall thickness less than 300 μm.

* * * * *